United States Patent
Kim

(10) Patent No.: US 7,200,412 B2
(45) Date of Patent: Apr. 3, 2007

(54) PAGING METHOD WHICH DYNAMICALLY CHANGES ACCORDING TO NETWORK CONDITIONS

(75) Inventor: Hoe-Won Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 603 days.

(21) Appl. No.: 10/757,894

(22) Filed: Jan. 15, 2004

(65) Prior Publication Data

US 2004/0152475 A1     Aug. 5, 2004

(30) Foreign Application Priority Data

Jan. 15, 2003   (KR) ...................... 10-2003-0002806

(51) Int. Cl.
*H04Q 7/20*     (2006.01)
(52) U.S. Cl. ...................... 455/458; 455/567; 455/434; 455/574
(58) Field of Classification Search ................ 455/458, 455/422.1, 434, 574, 426.1, 455, 515, 516, 455/343.1, 567
See application file for complete search history.

(56) References Cited

U.S. PATENT DOCUMENTS

2001/0015963 A1* 8/2001 Tuomainen et al. ........ 370/311

2005/0148348 A1*   7/2005   Cramby et al. ............. 455/458

* cited by examiner

*Primary Examiner*—Melur Ramakrishnaiah
(74) *Attorney, Agent, or Firm*—The Farrell Law Firm

(57) ABSTRACT

Disclosed are a paging method for a mobile communication system and a recording medium readable by a computer having a program for implementing the method that can dynamically adjust a paging period by lengthening a basic paging period and by shortening the paging period when the paging fails. The method includes a first step of a base transceiver subsystem (BTS) having a set initial paging value paging a mobile communication terminal within the BTS for a first period and checking a response to the paging, a second step of performing an operation according to the paging of the mobile communication terminal if it is confirmed that the response has been received through the checking at the first step, while replacing the first period with a second period obtained by dividing the first period by a predetermined value if it is confirmed that no response has been received through the checking at the first step, a third step of returning to the first step by replacing the first period with a minimum period preset by the initial value if the first period replaced at the second step is smaller than the minimum period, and a fourth step of returning to the first step by replacing the first period with the first period replaced at the second step if the first period replaced at the second step is larger than the minimum period.

11 Claims, 5 Drawing Sheets

PAGING METHOD WHICH DYNAMICALLY CHANGES ACCORDING TO NETWORK CONDITIONS

PRIORITY

This application claims priority to an application entitled "Paging Method Which Dynamically Changes According To Network Conditions" filed in the Korean Industrial Property Office on, Jan. 15, 2003 and assigned Serial No. 2003-2806, the contents of which are hereby incorporated by reference.

BACKGROUND OF THE INVENTION

1. Field of the Invention

The present invention relates to a call connection method for a mobile communication system, and more particularly to a paging method for a mobile communication system.

2. Description of the Related Art

FIG. 1 is a block diagram illustrating the construction of a general mobile communication system. A mobile communication terminal 100 makes a call connection with another mobile communication terminal through another base transceiver subsystem (BTS) 102, a control station 104 for managing the respective base transceiver subsystems, and a mobile switching center 106. Also, the mobile switching center 106 is connected to a home location register (HLR) 108 for storing location information of the respective mobile communication terminals and an authentication center 110 for performing an authentication process.

In operation, the mobile communication terminal 100 searches for the strongest signal transmitted from an adjacent base transceiver subsystem 102 and connects with the corresponding base transceiver subsystem. In this state, if a subscriber dials a phone number to originate a call, a mobile identification number (MIN) and an electronic serial number (ESN) are transmitted together with the phone number. The mobile switching center 106 performs the subscriber's authentication process through the authentication center 110, the base transceiver subsystem 102 transmits a channel allocation message to the mobile communication terminal 100, and the mobile communication terminal 100 starts the call using the allocated channel.

For this call connection, the mobile switching center 106 makes the base transceiver subsystem 102 transmit a paging signal. The mobile communication terminal 100 continuously scans the paging of the base transceiver subsystem 102, and if it detects the paging of its own number, it sends the ESN and the MIN to the nearest base transceiver subsystem 102.

Generally, before the paging starts, the mobile communication terminal 100 selects a proper serving cell, time/frequency-synchronizes with the selected serving cell, and receives related system information.

Also, the mobile communication terminal 100 registers in HLR 108 information on which base transceiver subsystem 102 or control station 104 provides a service to the mobile communication terminal 100. Accordingly, the synchronization and the location registration processes are completed before the paging starts.

That is, the mobile communication terminal 100, after it connects with a certain base transceiver subsystem 102, registers itself in the base transceiver subsystem 102 in order to inform that it is located within a receiving area of the corresponding base transceiver subsystem 102. This registered information is written in a database of the network, so that the corresponding base transceiver subsystem 102 can page the mobile communication terminal 100 registered in the corresponding base transceiver subsystem 102 if a communication with the mobile communication terminal 100 such as a call connection is needed.

Here, in order to detect the location and connection state of the mobile communication terminal 100 and to achieve a call connection, the base transceiver subsystem 102 transmits a paging signal, and the mobile communication terminal 100 scans the paging signal from the base transceiver subsystem 102. This process is for searching for the base transceiver subsystem 102 most suitable for the mobile communication terminal 100, and is an essential function for the mobile communication system.

The purpose of the paging is to inform the mobile communication system 100 of a phone call. Generally, the paging is performed by periodically allocating a paging channel (PCH) to the mobile communication terminal 100.

According to a conventional paging method, the channel information for paging is shared by all mobile communication terminals, and is divided, so that the paging of other mobile communication terminals can be performed.

These respective unit blocks are call paging channels (PCHs). At this time, since a specified mobile communication terminal does not know at what time point the paging signal for itself comes, it must read all the related PCHs. This means that the mobile communication terminal must continuously perform a receiving operation in a state in which no connection is actually made, resulting in excessive power consumption. In order to avoid this, a method for classifying all the mobile communication terminals by paging groups has been introduced.

Such paging groups are illustrated in FIG. 2. As shown in FIG. 2, there are paging groups A, B, C, . . . H. The PCH position for one paging group is periodically given as illustrated in FIG. 2.

During paging through the paging groups, the respective mobile communication terminal finds its own paging group through its own inherently provided information that includes a product identification number, and receives only the PCH of the corresponding paging group.

After the paging of one paging group (for example, paging group A), a paging period, which is a time period required for paging the corresponding paging group A, is given. This paging period is determined according to the number of paging groups. That is, if the paging period is large, the number of paging groups increases, while if the paging period is small, the number of paging groups decreases.

Different methods of determining the paging period are used in different mobile communication systems. For example, in case of a global system for mobile communication (GSM) network, the BTS determines the paging period using an internally determined value through system information, and in case of a general packet radio service (GPRS) network, the paging period is determined through a type of negotiation when the mobile communication is registered.

Once the period is determined, the PCH for the corresponding mobile communication terminal is allocated by accurately observing the paging period so that the BTS receives only the corresponding position without any separate engagement and receives the connection request.

The respective mobile communication terminal periodically receives the PCH that belongs to its own paging group, confirms the contents of the PCH, and attempts the connection in response to the PCH only when it is the subject of paging. Otherwise, it ignores the contents of reception.

However, due to the characteristics of a wireless network, the mobile communication terminal may fail to receive a portion of PCH information, and may not know whether it has been paged. In this case, if no response is received, the BTS pages again the same mobile communication terminal, and after the paging is performed as many times as an internally pre-determined number, it recognizes that the corresponding mobile communication terminal is absent. However, if a response is received from the mobile communication terminal during the paging, the BTS performs the call connection.

If the time that the mobile communication terminal responds to the paging from the BTS is defined as a paging response duration (PRD) after the BTS starts the paging of the mobile communication terminal, it can be expressed by "PRD=paging period×number of failures in PCH reception." Here, the reason why the PRD is not defined with "number of failures in PCH reception-1" is that the time required for initially waiting for the PCH position of the paging group of the mobile communication terminal after the BTS decides to page the corresponding mobile communication terminal may be the maximum 1-paging period.

The failure in PCH reception may mean that the mobile communication terminal receives the corresponding PCH from the BTS but cannot read received information, or information that the mobile communication terminal attempts to send to the BTS is not stably transferred to the BTS.

Specifically, there is no case in which the mobile communication terminal cannot receive the PCH. That is, the mobile communication terminal always receives radio frequency (RF) signals, always at determined time points. However, the mobile communication terminal may fail to decode the received signal. Also, there is no case in which the mobile communication terminal cannot connect to the BTS after receiving the PCH, but information that the mobile communication terminal attempts to send to the BTS may not be stably transferred to the BTS. In other words, the mobile communication terminal and the BTS unconditionally receive information at the engaged time points, but may not read the received information.

As shown in FIG. 2, lengthening or shortening the paging period brings a wide difference in the methods for setting the paging period, performing the paging according to the paging period, and scanning the paging information according to the paging period.

That is, when shortening the paging period, the response speed of the paged mobile communication terminal becomes high, the call connection is promptly performed accordingly, and the PRD value becomes small when the PCH reception for the same number of times fails. In this case, however, due to the mobile communication terminal's scanning operation of the paging, the battery consumption increases, and the number of mobile communication terminals that can be accommodated in the same PCH decreases.

If many mobile communication terminals are used in a state in which the number of mobile communication terminals that can be accommodated in the same PCH decreases, the number of mobile communication terminals allocated in the same paging group increases due to the small number of paging groups, and this causes the number of mobile communication terminals that cannot be timely allocated with the PCH to increase and also causes the time required for the initial paging to be lengthened. Consequently, in order to shorten the paging period, many PCHs must be secured in proportion to the expected number of mobile communication terminals.

Meanwhile, when lengthening the paging period, in contrast with the case of shortening the paging period, since the scanning period required for the mobile communication terminal's scanning operation of the paging is shortened, the battery consumption decreases, and the number of mobile communication terminals that can be accommodated in the same PCH increases. However, the response speed of the paged mobile communication terminal is low, the call connection becomes slow, and the PRD value becomes large when the PCH reception for the same number of times fails.

Accordingly, there is a need for a new paging method for gaining both advantages obtained by shortening and lengthening the paging period rather than fixing the paging period.

SUMMARY OF THE INVENTION

Accordingly, an object of the present invention is to provide a paging method and a recording medium readable by a computer having a program for implementing the method that can gain both advantages obtained by lengthening and shortening a paging period by lengthening a basic paging period and by shortening the paging period when the paging fails.

In order to accomplish this object, there is provided a paging method which dynamically changes according to network conditions comprising a first step of setting an initial paging value in a base transceiver subsystem (BTS) for paging a mobile communication terminal within the BTS for a first period and checking a response to the paging, a second step of performing an operation according to the paging of the mobile communication terminal if it is confirmed that the response has been received through the checking at the first step, while replacing the first period with a second period obtained by dividing the first period by a predetermined value if it is confirmed that no response has been received through the checking at the first step, a third step of returning to the first step by replacing the first period with a minimum period preset by the initial value if the first period replaced at the second step is smaller than the minimum period, and a fourth step of returning to the first step by replacing the first period with the first period replaced at the second step if the first period replaced at the second step is larger than the minimum period.

In accordance with another aspect of the present invention, there is provided a paging method which dynamically changes according to network conditions comprising a first step of setting an initial paging value in a mobile communication terminal for checking whether a paging channel has been received by performing a search for the paging channel for a first period of a base transceiver subsystem (BTS) to which the mobile communication terminal belongs, a second step of checking whether the paging is meant for the mobile communication terminal by analyzing information of the received paging channel if it is confirmed that the paging channel has been received through the checking at the first step, a third step of returning to the first step by replacing the first period with a second period obtained by dividing the first period by a predetermined value if it is confirmed that the paging channel has been received through the checking at the first step, and a fourth step of performing an operation according to the paging if it is confirmed that the paging is for the mobile communication terminal through the checking at the second step, while returning to the first step by replacing the first period with a third period obtained by multiplying the first period by a predetermined value if it is confirmed that the paging is not for the mobile communication terminal through the checking.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, the paging method which dynamically changes according to network conditions according to a preferred embodiment of the present invention will be described with reference to the accompanying drawings. In the following description of the present invention, a detailed description of known functions and configurations incorporated herein will be omitted when it may make the subject matter of the present invention unclear.

In performing the paging, the present invention provides a paging method which does not fix the paging period as in the conventional method, but sets a long period in a normal state, while it sets a short period if the paging fails. Thus, the present invention prevents the lengthening of a paging response duration (PRD) and enables a faster response in cases where the paging fails during the long paging period. The paging method according to the present invention includes a BTS process of paging the mobile communication terminal and a mobile communication terminal's process of scanning the paging signal of the BTS and detecting the paging signal.

Figure 1:
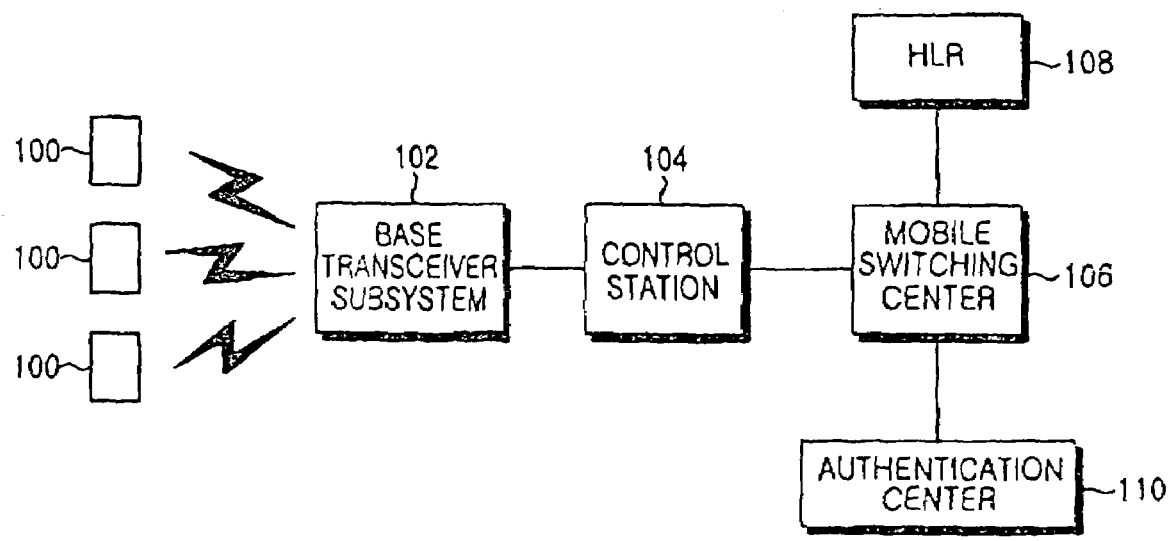
FIG. 1 is a block diagram illustrating the construction of a general mobile communication system.
Figure 2:
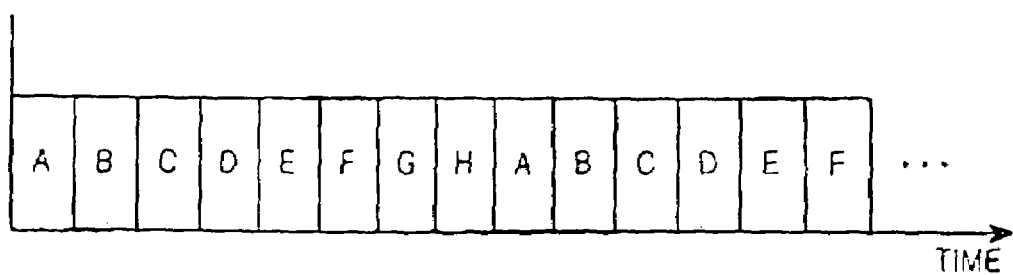
FIG. 2 illustrates paging periods through conventional paging groups.
Figure 3:
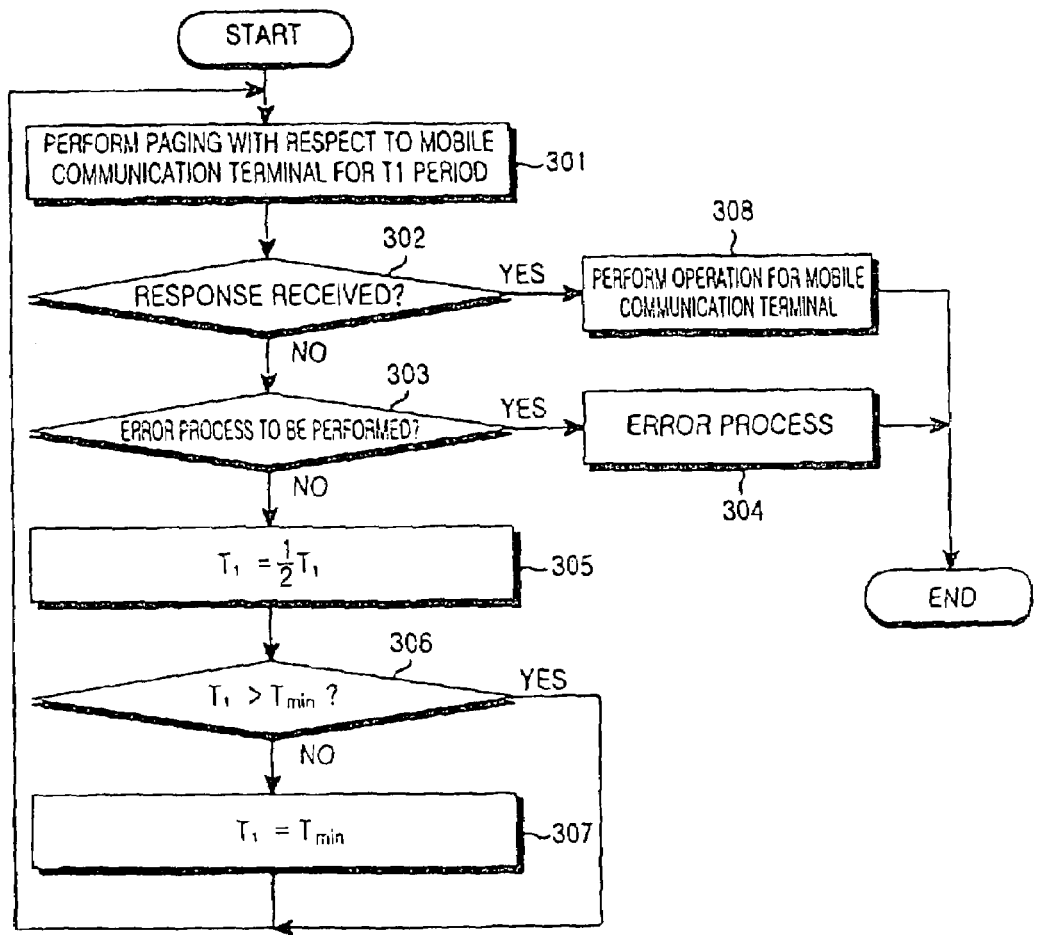
FIG. 3 is a flowchart illustrating a paging method of BTS which dynamically changes according to network conditions according to an embodiment of the present invention.

FIG. 3 is a flowchart illustrating a paging method of a BTS which dynamically changes according network conditions according to an embodiment of the present invention.

The base transceiver subsystem (BTS), in order to grasp the location and connection state of the mobile communication terminal and to make a call connection, pages the mobile communication terminal that belongs to the BTS for a "T1" period at step 301. Here, "T1" means a period corresponding to a state that no paging failure is produced, and, in the present invention, it may be set to be longer than the typically-used paging period.

The BTS confirms whether a response from the corresponding mobile communication terminal is received with respect to the paging at an engaged position at step 302, and if so, it performs an operation such as a call connection with respect to the mobile communication terminal at step 308. If no response is received, the BTS decides whether to perform an error process with respect to the corresponding mobile communication terminal at step 303. This error process is decided in a different manner according to the type of mobile communication system. According to a representative method for the error process, a maximum time required for repeatedly requesting the response if no response is received is pre-set, and if the pre-set maximum time is over, the BTS performs an "absence process" or a "call connection fail process." If it is decided that the error process is to be performed at step 303, the BTS performs the error process at step 304, and the paging method comes to end. The process of the steps 303 to 304 can be performed at any position during the process of steps 305 to 307. In the embodiment of the present invention, whether to perform the error process is confirmed just after the checking of the response. Specifically, the error processing method is classified into two methods. One method is to count the number of connection failures during the paging using a counting function, and perform the error process if the number of connection failures exceeds a predetermined number. The other method is to count the paging time and perform the error process if the sum of the counted paging times exceeds a predetermined time.

Meanwhile, if it is decided that the error process is not to be performed at step 303, the BTS replaces "T1" with "½T1" at step 305, and confirms whether the replaced "T1" is larger than a specified "Tmin" at step 306. Here, "Tmin" means the minimum period preset for shortening the period. In the embodiment of the present invention, the period is shortened using "½T1", but "⅓T1", "¼T1", etc., may also be used without departing from the scope of the invention. It should be observed that the same factor for shortening the period such as "½T1", "⅓T1", "¼T1", etc., should be used in both the mobile communication terminal and the BTS. In the embodiment of the present invention, "Tmin" is set to "⅛T1."

Also, if "T1" is smaller than "Tmin" as a result of checking at step 306, the BTS replaces "T1" with "Tmin" (step 307), and pages the mobile communication terminal that belongs to the BTS for the replaced "T1" period by returning to step 301. That is, "T1" at step 301 as re-performed becomes "T1" as replaced through the process of steps 305 to 307.

Meanwhile, if "T1" is larger than "Tmin" as a result of checking at step 306, the BTS returns to step 301, and pages the mobile communication terminal that belongs to the BTS for the "T1" period at step 301. "T1" at step 301 as re-performed becomes "T1" as replaced through the process of steps 305 to 306.

Figure 4:
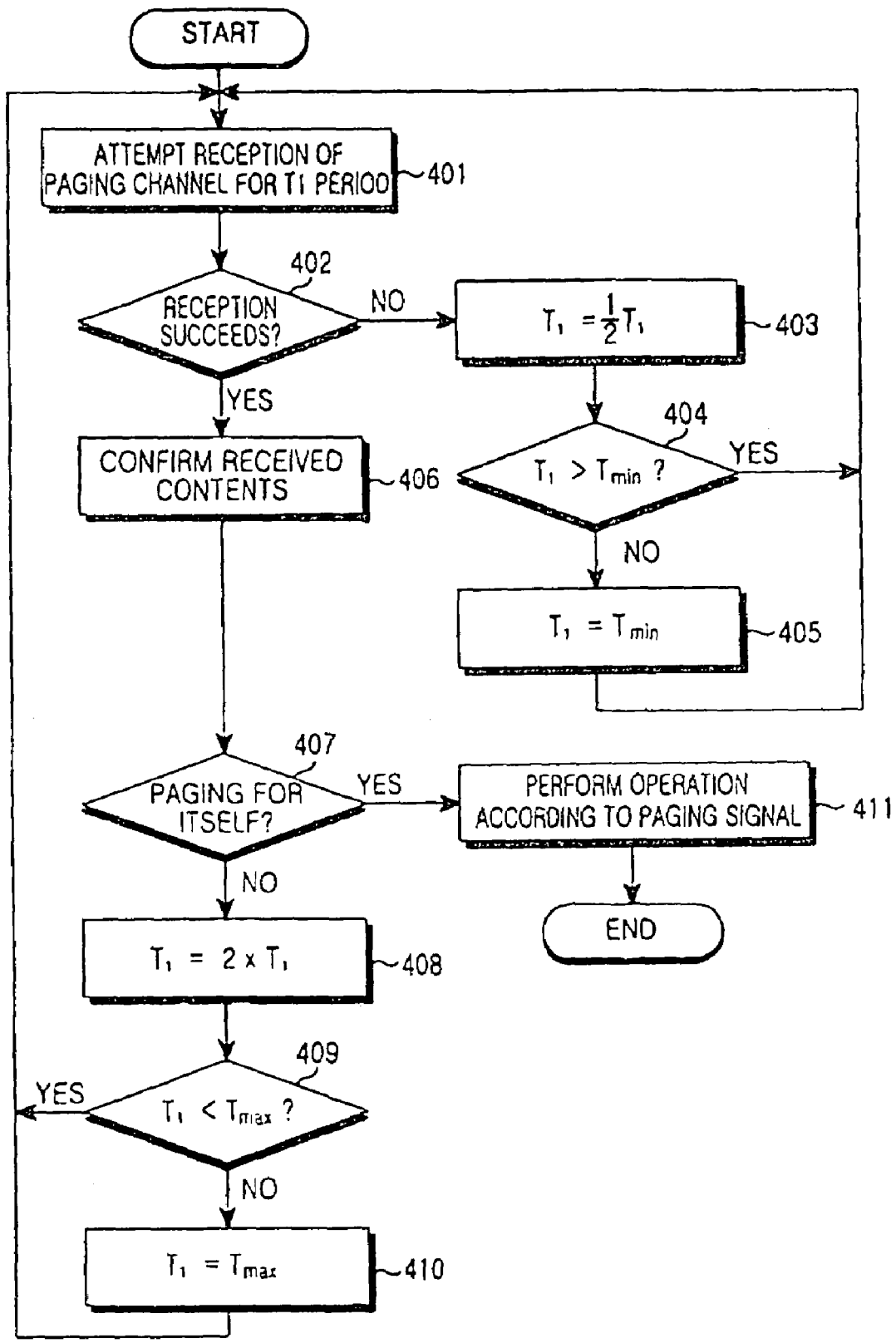
FIG. 4 is a flowchart illustrating a paging method of a mobile communication terminal which dynamically changes according to network conditions according to an embodiment of the present invention.

FIG. 4 is a flowchart illustrating a mobile terminal's paging method which dynamically changes according network conditions according to the embodiment of the present invention.

The mobile communication terminal, in order to search for a paging signal for the BTS' call connection attempt with respect to the terminal, attempts reception of the paging channel for a specified "T1" period at step 401. Here, "T1" means a paging period set through a negotiation between the mobile communication terminal and the BTS during the registration of the mobile communication terminal, and it may generally be set to be longer than the typically used paging period.

Meanwhile, if the reception of the paging channel from the BTS does not succeed at step 402, the mobile communication terminal replaces "T1" with "½T1" at step 403, and confirms whether the replaced "T1" is larger than a specified "Tmin" at step 404. Here, "Tmin" means the minimum period preset for shortening the period. In this embodiment of the present invention, the period is shortened using "½T1", but "⅓T1", "¼T1", etc., may also be used without departing from the scope of the invention. In this embodiment of the present invention, "Tmin" is set to "⅛T1."

Also, if "T1" is smaller than "Tmin" as a result of checking at step 404, the mobile communication terminal replaces "T1" with "Tmin" at step 405, and attempts the reception of the paging channel by searching for the paging signal for the BTS' call connection attempt with respect to the mobile communication terminal for the replaced "T1" period by returning to step 401. Here, "T1" becomes "T1" as replaced through the process of steps 403 to 405.

Meanwhile, if "T1" is larger than "Tmin" as a result of checking at step 404, the mobile communication terminal returns to step 401, and attempts the reception of the paging channel for the "T1" period by searching for the paging signal for the BTS' call connection attempt with respect to the mobile communication terminal at step 401. "T1" at step 401 as re-performed becomes "T1" as replaced through the process of steps 403 to 404.

Meanwhile, if the reception of the paging channel from the BTS succeeds at step 402, the mobile communication terminal confirms whether the paging is for itself at step 407 after checking the received contents at step 406.

If it is confirmed that the received paging is for the corresponding mobile communication terminal at step 407, the mobile communication terminal responds to the BTS, and performs an operation corresponding to the paging signal transferred from the BTS such as, for example, a call connection at step 411.

Meanwhile, if it is determined that the received paging is not for the corresponding mobile communication terminal at step 407, the mobile communication terminal replaces "T1" with "2×T1" at step 408, and confirms whether the replaced "T1" is smaller than a specified "Tmax" at step 409. Here, "Tmax" means the maximum period preset for lengthening the period, and typically means an initial period. In this embodiment of the present invention, the period is lengthened using "2×T1", and this is for compensating for the "½T1" period for shortening the period. Thus, if the period is reduced to "⅓T1", "¼T1", etc., then "3×T1", "4×T1", etc., are used for lengthening the period, respectively.

Also, if it is determined that "T1" is larger than "Tmax" as a result of checking at step 409, the mobile communication terminal replaces "T1" with "Tmax" at step 410, and attempts the reception of the paging channel for the replaced "T1" period in order to search for the paging signal for the BTS' call connection attempt with respect to the mobile communication terminal by returning to step 401. Here, "T1" at step 401 as re-performed becomes "T1" as replaced through the process of steps 408 to 410.

Meanwhile, if it is determined that "T1" is smaller than "Tmax" as a result of checking at step 409, the mobile communication terminal returns to step 401, and attempts the reception of the paging channel for the "T1" period in order to search for the paging signal for the BTS' call connection attempt with respect to the mobile communication terminal. At this time, "T1" at step 401 as re-performed becomes "T1" as replaced through the process of steps 408 to 409.

Figure 5:
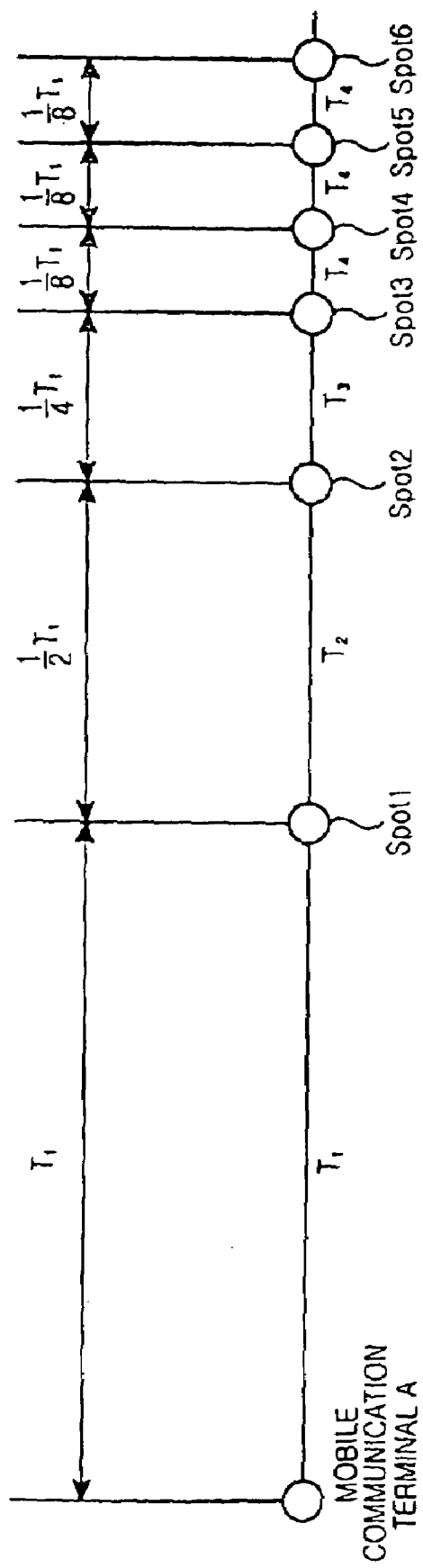
FIG. 5 illustrates the period change in the paging method which dynamically changes according to network conditions according to the present invention.

The paging period that dynamically changes according to network conditions as shown in FIGS. 3 and 4 will be explained in detail with reference to FIG. 5. FIG. 5 illustrates the period change in the paging method which dynamically changes according to network conditions according to the present invention.

In the present invention, the BTS and the mobile communication terminal have a long paging period in a normal case, but if the paging fails, the paging period is reduced by ½ (this is just in the shown embodiment, but not limited thereto). If the paging fails again, the paging period is further reduced by ½. This is to solve the problems that, if the paging fails, the PRD increases and the paging period is lengthened to delay the operation for the paging and response.

As shown in FIG. 5, the period of the paging channel for the mobile communication terminal A is generally set to "T1", but if no response is received after the "T1" period, i.e., at spot 1, the next period becomes "T2" that is "½T1." Also, if no response is received after the "T2" period, i.e., at spot 2, the next period becomes "T3" that is "¼T1, and then if no response is received after the "T3" period, i.e., at spot 3, the next period becomes "T4" that is "⅛T1." "T4", which is "⅛T1", is set as "Tmin", and is set as "Tmin", and if no response is received at spot 4, the next period at spot 5, spot 6, etc., becomes "T4."

At this time, if the mobile communication terminal receives the paging signal at spot 4 but the received paging signal is not for itself, the paging period is not directly returned to "T1" but is returned to "T3", "T2", and then "T1" in turn (through the process of steps 407 to 410 in FIG. 4). The maximum period during the return becomes "T1", that is the initial period.

Through the above-described dynamic change of the paging period, an adaptive paging period according to the channel environment, not the fixed paging period, can be obtained. That is, the first period "T1" is the conventional long period that corresponds to a typical sleep mode, and in this period, the battery consumption and the number of mobile communication terminals included in the paging channel can be reduced. If the paging fails, the period is shortened to provide the rapid response and the short PRD. In addition, by setting "Tmin" as the conventional short paging period, the battery consumption is not more than that for the conventional paging period even if the paging fails.

In order to perform the method for reducing the paging period proposed by the flowcharts of FIGS. 3 and 4, the present invention proposes the reduction of the paging period by ½ if the paging fails. Here, in reducing the period between the BTS and the mobile communication terminal, if synchronization between them is not effected, it causes a big problem in their connection. In the description, the reduction of the period by ½ means a set of periods obtained by reducing the original period by ½. That is, if it is assumed that the set of the original period is "T1 set", the periods when the paging fails become "½T1 set", that is the set of "½T1" period, and "¼T1 set", that is the set of "¼T1" period.

Specifically, the "T1 set" is expressed by {1,5,9, . . . (here the period is 4)}, the "½T1 set" {1,3,5,7,9, . . . }, and the "¼T1 set" {1,2,3,4,5,6,7,8,9, . . . }. Accordingly, the reduction of the period means that the paging signal should be received at the nearest time point among time points that belong to the set of the reduced periods. That is, if the paging fails at a time point 5 of the "T1 set", the next paging is attempted at a time point 7 that is the next time point of the "½T1 set" with respect to the time point 5. In contrast, if the reception of the paging succeeds at a time point 6 of the "¼T1 set", the next paging is attempted at the next time point 7, that is the nearest time point of the "½T1 set" with respect to the time point 6. "T1 set", "½T1 set", {1,3,5,7, 9 . . . } and "¼T1 set" is selected depending on success or failure of paging. That is, upon failure, it is selected by the sequence of T1 set, ½T1 set and ¼T1 set. And, upon success, it is selected by the reverse sequence. With the sets selected by the above sequence, the paging is accomplished by a period next to a period corresponding to a period of a previous set.

Figure 6:
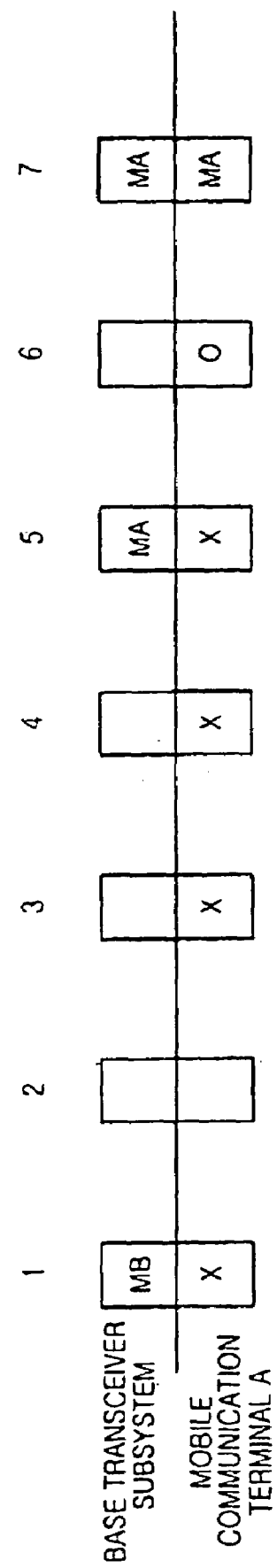
FIG. 6 illustrates a call connection process using the paging method which dynamically changes according to network conditions according to the present invention.

FIG. 6 illustrates a call connection process using the paging method which dynamically changes according to network conditions according to the present invention.

Referring to FIG. 6, positions indicated as 1, 2, 3, 4, . . . denote the respective PCHs. The upper portion thereof represents the paging contents of the BTS, and the lower portion thereof represents the contents that the mobile communication terminal A receives, wherein "X" indicates a reception failure, and "O" indicates a case in which the reception succeeds but the received contents are not for itself. The numerals MA and MB in FIG. 6 indicate mobile communication terminals included in the BTS. MA is the mobile communication terminal subject to the call connection, and MB is another mobile communication terminal in the same PCH.

In FIG. 6, the present period is "4." In the position 1, the BTS paged the mobile communication terminal B, and the mobile communication terminal A failed to receive the contents paged by the BTS. Accordingly, the BTS normally pages at the position 5. Meanwhile, as the mobile communication terminal A failed the reception, it re-attempts the reception at the position 3 by reducing the period by ½. If the mobile communication terminal further fails, it re-attempts the reception again at the position 4 by reducing the period by ½. At this time, since the period "1" is the minimum period, the period is not further reduced even if the paging fails again, but the reception is continuously attempted for the minimum period.

Although the BTS paged the mobile communication terminal A in the position 5, the mobile communication terminal failed to receive the contents, and thus the BTS performs the paging again in the position 7 by reducing the paging period by ½.

Meanwhile, it is assumed that the mobile communication terminal failed the reception in the position 5, but succeeds in reception in the position 6. At this time, since the signal is not for the mobile communication terminal A itself, the period is changed to "present period×2." Since "present period×2" is for selecting the position next to the corresponding number, the mobile communication terminal receives the signal in the position 7. Through these processes, the mobile communication terminal A can connect the call in the position 7.

Specifically, in reducing the period between the BTS and the mobile communication terminal, if synchronization between them is not effected, it causes a big problem in their connection. In the present invention, the reduction of the period by ½ means a set of periods obtained by reducing the original period by ½. That is, if it is assumed that the set of the original period is "T1 set", the periods when the paging fails become "½T1 set", that is the set of ½T1" period, and "¼T1", that is the set of "¼T1" period.

Specifically, the "T1 set" is expressed by {1,5,9, . . . (here the period is 4)}, the "½T1 set" {1,3,5,7,9, . . . }, and the "¼T1 set" {1,2,3,4,5,6,7,8,9, . . . }. Accordingly, the reduction of the period means that the paging signal should be received at the nearest next time point among time points that belong to the set of the reduced periods. That is, if the paging fails at the time point 5 of the "T1 set", the next paging is attempted at a time point 7 that is the next time point of the "½T1 set." In contrast, if the reception of the paging succeeds at a time point 6 of the "¼T1 set", the next paging is attempted at the time point 7, that is the nearest time point of the "½T1 set."

Also, the amount of battery consumption of a basic mobile communication terminal is expressed by "amount of battery consumption of a mobile communication terminal=PG (paging period)×amount of power consumed in receiving the paging by once", and the PRD is expressed by "PRDn=time from the initial paging time point to a time point when the mobile communication terminal starts to respond in case that the PCH reception fails n times."

According to the conventional method, the amount of battery consumption becomes "fixed paging period×amount of power consumed by once the paging reception", and "PRDn" is given as "n×fixed paging period." According to the present invention, the amount of battery consumption of the mobile communication terminal becomes "first paging period×amount of power consumed by once the paging reception", and if the paging fails, the period is shortened in comparison to the initial paging period to increase the power consumption. However, since the mobile communication terminal generally stands by in a sleep mode in which the terminal periodically performs the paging, the amount of battery consumption can be greatly reduced by lengthening the initial paging period in comparison to the fixed paging period. Also, "PRDn" is given by "initial paging period"+"initial paging period/2"+"initial paging period/4", and thus a relatively high response speed can be achieved.

In an extreme case, if it is extremely assumed that the fixed paging period according to the conventional method is 2 seconds, the ten-times paging failure causes a great time delay of 20 seconds (=2×10). In the present invention, even if the initial paging period is set to 4 seconds, the ten-times paging failure causes 14 seconds (=4+2+1×8), which is shorter than the fixed paging period by 6 seconds.

As described above, according to the present invention, the paging period of the mobile communication terminal, which confirms the reception through paging in a standby state, can be dynamically controlled, and thus the battery consumption can be reduced with a short paging response time.

The paging method according to the present invention can be implemented by a program and can be stored in a recording medium (such as a CD ROM, RAM, floppy disk, hard disk, optical and magnetic disks, etc.) in a form that can be read by a computer.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A paging method which dynamically changes according to network conditions, comprising:
   a first step of setting an initial paging value in a base transceiver subsystem (BTS) for paging a mobile communication terminal within the BTS for a first period and checking a response to the paging;
   a second step of performing an operation according to the paging of the mobile communication terminal if it is confirmed that the response has been received through the checking at the first step, while replacing the first period with a second period obtained by dividing the first period by a predetermined value if it is confirmed that no response has been received through the checking at the first step;
   a third step of returning to the first step by replacing the first period with a minimum period preset by the initial value if the first period replaced at the second step is smaller than the minimum period; and a fourth step of returning to the first step by replacing the first period with the first period replaced at the second step if the first period replaced at the second step is larger than the minimum period.

2. The method of claim 1, further comprising a fifth step performing an error process by the BTS with respect to the mobile communication terminal if no response has been received from the mobile communication terminal although a predetermined time elapses from an initial non-response time.

3. A paging method which dynamically changes according to network conditions, comprising:

a first step of setting an initial paging value in a mobile communication terminal for checking whether a paging channel is received by performing a search for the paging channel for a first period of a base transceiver subsystem (BTS) to which the mobile communication terminal belongs;

a second step of checking whether the paging is for the mobile communication terminal by analyzing information of the received paging channel if it is confirmed that the paging channel has been received through the checking at the first step;

a third step of returning to the first step by replacing the first period with a second period obtained by dividing the first period by a predetermined value if it is confirmed that the paging channel has been received through the checking at the first step; and a fourth step of performing an operation according to the paging if it is confirmed that the paging is meant for the mobile communication terminal through the checking at the second step, while returning to the first step by replacing the first period with a third period obtained by multiplying the first period by a predetermined value if it is confirmed that the paging is not meant for the mobile communication terminal through the checking.

4. The method of claim 3, wherein the third step comprises:

a fifth step of replacing the first period with a second period obtained by multiplying the first period by a first coefficient if it is confirmed that no response has been received through the checking at the first step;

a sixth step of returning to the first step by replacing the first period with a preset minimum period if the first period replaced at the fifth step is smaller than the minimum period; and a seventh step of returning to the first step by replacing the first period with the first period replaced at the fifth step if the first period replaced at the fifth step is larger than the minimum period.

5. The method of claim 4, wherein the fourth step comprises:

an eighth step of performing an operation according to the paging if it is confirmed that the paging is meant for the mobile communication terminal through the checking at the second step;

a ninth step of replacing the first period with the third period obtained by multiplying the first period at the first step by a second coefficient if it is confirmed that the paging is not meant for the mobile communication terminal through the checking at the second step;

a tenth step of returning to the first step by replacing the first period with a preset maximum period if the first period replaced at the ninth step is larger than the maximum period; and an eleventh step of returning to the first step by replacing the first period with the first period replaced at the ninth step if the first period replaced at the ninth step is smaller than the maximum period.

6. The method of claim 5, wherein the first and second coefficients are reciprocal to each other.

7. A recording medium readable by a computer having a program for realizing:

a first function of a base transceiver subsystem (BTS) provided with a processor and having a set initial paging value paging a mobile communication terminal within the BTS for a first period and checking a response to the paging;

a second function of performing an operation according to the paging of the mobile communication terminal if it is confirmed that the response has been received through the checking by the first function, while replacing the first period with a second period obtained by dividing the first period by a predetermined value if it is confirmed that no response has been received through the checking by the first function;

a third function of performing the first function by replacing the first period with a minimum period preset by the initial value if the first period replaced by the second function is smaller than the minimum period; and a fourth function of performing the first function by replacing the first period with the first period replaced by the second function if the first period replaced by the second function is larger than the minimum period.

8. A recording medium readable by a computer having a program for realizing:

a first function of a mobile communication terminal provided with a processor and having a set initial paging value checking whether a paging channel is received by performing a search for the paging channel of a first period of a base transceiver subsystem (BTS) to which the mobile communication terminal belongs;

a second function of checking whether the paging is for the mobile communication terminal by analyzing information of the received paging channel if it is confirmed that the paging channel has been received through the checking by the first function;

a third function of performing the first function by replacing the first period with a second period obtained by dividing the first period by a predetermined value if it is confirmed that the paging channel has been received through the checking by the first function; and a fourth function of performing an operation according to the paging if it is confirmed that the paging is meant for the mobile communication terminal through the checking by the second function, while performing the first function by replacing the first period with a third period obtained by multiplying the first period by a predetermined value if it is confirmed that the paging is not meant for the mobile communication terminal through the checking.

9. A paging method which dynamically changes according to network conditions, comprising:

a first step of performing a paging with respect to a mobile communication terminal in a base transceiver subsystem for a specified first period and checking a response from the mobile communication terminal;

a second step of comparing a second period obtained by dividing the first period by a specified integer value with a specified minimum period set as the smallest period if no response for the paging has been received from the mobile communication terminal;

a third step of returning to the first step by replacing the first period with the minimum period if the second period is smaller than the minimum period; and a fourth step of returning to the first step by replacing the first period with the second period if the second period is larger than the minimum period.

10. A paging method which dynamically changes according to network conditions, comprising:

a first step of a mobile communication terminal performing a search for a paging channel of a base transceiver subsystem to which the mobile communication terminal belongs for a specified first period;

a second step of comparing a second period obtained by dividing the first period by a specified integer value with a specified minimum period set as the smallest period if no response for the paging has been received for the first period;

a third step of returning to the first step by replacing the first period with the minimum period if the second period is smaller than the minimum period; and a fourth step of returning to the first step by replacing the first period with the second period if the second period is larger than the minimum period.

11. The method of claim 10, further comprising:

a fifth step of performing a paging operation if the mobile communication terminal itself is paged for the first period at the second step;

a sixth step of comparing a third period obtained by multiplying the first period by a specified integer value with a specified maximum period set as the largest period if the mobile communication terminal itself has not been paged at the second step;

a seventh step of returning to the first step by replacing the first period with the maximum period if the third period is larger than the maximum period; and an eighth step of returning to the first step by replacing the first period with the third period if the third period is smaller than the maximum period.

* * * * *